United States Patent
Mori et al.

(10) Patent No.: US 7,361,050 B2
(45) Date of Patent: Apr. 22, 2008

(54) CABLE MANAGEMENT DEVICE FOR USE IN CONNECTION WITH A POWER CENTER, AND CABLE MANAGEMENT SYSTEM COMPRISING SAME

(75) Inventors: Kenneth Mori, Los Angeles, CA (US); John Wadsworth, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/282,875

(22) Filed: Nov. 17, 2005

(65) Prior Publication Data

US 2007/0111585 A1    May 17, 2007

(51) Int. Cl.
*H01R 13/72* (2006.01)

(52) U.S. Cl. .................. 439/501; 439/369

(58) Field of Classification Search ........... 439/369, 439/449, 501
See application file for complete search history.

(56) References Cited

U.S. PATENT DOCUMENTS

| | | | | |
|---|---|---|---|---|
| 4,457,571 A | * | 7/1984 | Lavine et al. ............... | 439/369 |
| 4,494,809 A | * | 1/1985 | Soloman .................... | 439/369 |
| 5,011,427 A | * | 4/1991 | Martin ....................... | 439/373 |
| 5,104,335 A | * | 4/1992 | Conley et al. .............. | 439/369 |
| 5,655,924 A | * | 8/1997 | Cross et al. ................ | 439/373 |
| 6,179,665 B1 | | 1/2001 | Rossman et al. | |
| 2006/0276077 A1 | * | 12/2006 | Mori .......................... | 439/538 |

OTHER PUBLICATIONS

Organize-It-Online.com; Oxo Cord and Cable Clips (Set of 4); http://www.organize-it-online.com/itm_ggcordclips.html;retrieved from the internet on Nov. 11, 2006; 2 pages.
Oxo International—GoodGrips Cord & Cable Clip—4pk White; http://www.oxo.com/catalog/product_info.php?products_id=528; retrieved from the Internet on Nov. 17, 2005.
Belkin 1—Outlet SurgeMaster® Gold; Part # F9G1030-12; http://catalog.belkin.com/IWCatProductPage.process?Merchant_Id= &Product_Id=12841; retrieved from the Internet on Nov. 18, 2005.

* cited by examiner

*Primary Examiner*—Thanh-Tam Le
(74) *Attorney, Agent, or Firm*—Bryan Cave LLP (57) ABSTRACT

A cable management device for use in connection with a power center (210, 500, 810) comprises a perimeter wall (110, 410, 710) defining a passageway (120, 420, 720) capable of receiving a cable (820) coupled to the power center, and an attachment feature (130, 430, 450, 730) adjacent to the perimeter wall and capable of removably engaging the cable management device with at least one of the power center and a power cord (220, 817) of the power center.

20 Claims, 9 Drawing Sheets

CABLE MANAGEMENT DEVICE FOR USE IN CONNECTION WITH A POWER CENTER, AND CABLE MANAGEMENT SYSTEM COMPRISING SAME

FIELD OF THE INVENTION

This invention relates generally to cable management, and relates more particularly to a cable management device capable of removable attachment to a power center.

BACKGROUND OF THE INVENTION

As advancing technology makes possible an increasing number of electronic devices, the problem of cable management becomes both more difficult and more important. Left unmanaged, the various power cords and other cables used by electronic devices can combine to create an unsightly and potentially unsafe situation in which such cables can become tangled and disorganized. A large number of cable management devices have been developed, and many of these are at least somewhat effective in increasing cable organization. What is lacking, however, is a versatile cable management device that is adaptable to multiple cable management situations and needs. Accordingly, there exists a need for a cable management device that is versatile enough to provide multiple cable management options.

BRIEF DESCRIPTION OF THE DRAWINGS

The invention will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner. The phrase "adjacent to," as used herein, encompasses the meanings of "next to," "close to," "lying near," "adjoining," and the like, whether or not the elements described as being adjacent to each other are in physical contact with each other.

DETAILED DESCRIPTION OF THE DRAWINGS

In one embodiment of the invention, a cable management device for use in connection with a power center comprises: (a) a perimeter wall defining a passageway capable of receiving a cable coupled to the power center; and (b) an attachment feature adjacent to the perimeter wall and capable of removably engaging the cable management device with at least one of the power center and a power cord of the power center. The phrase "power center," as used herein, includes power strips, power bars, surge protectors, multi-outlet adaptors, uninterruptible power supplies, televisions and other components of home entertainment systems, computer equipment, computer peripherals, and any electronic device that is associated with a plurality of cords or cables, whether such cords or cables are an integral part of such device or whether such cords or cables may be attached to or connected with such device.

Figure 1:
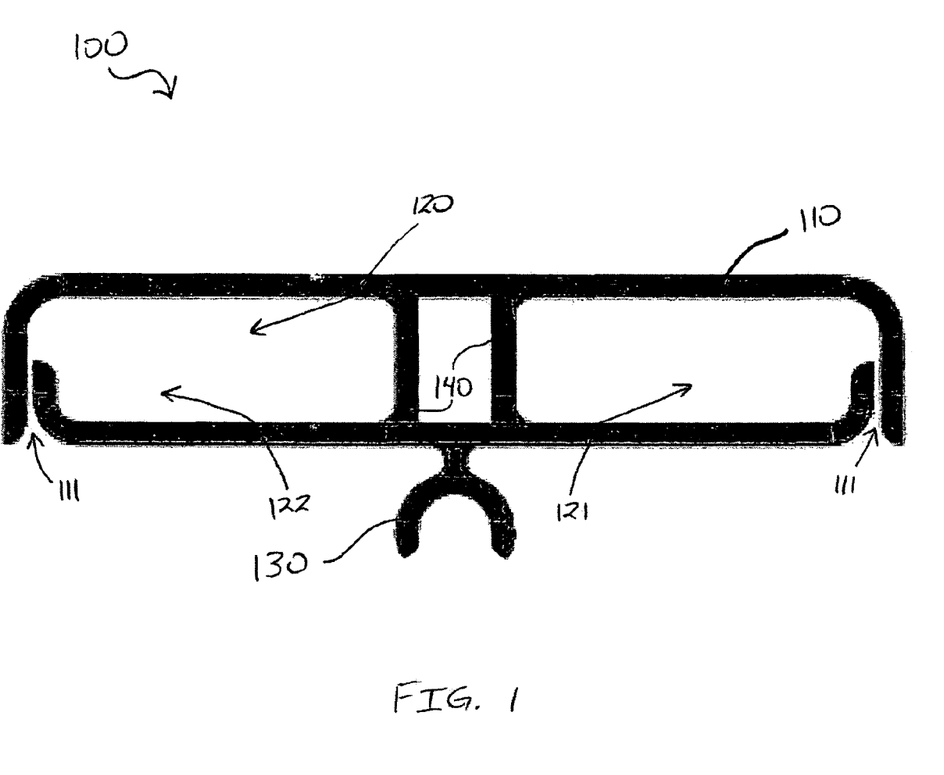
FIG. 1 is an elevational view of a cable management device according to an embodiment of the invention.

Referring now to the figures, FIG. 1 is an elevational view of a cable management device 100 according to an embodiment of the invention. As illustrated in FIG. 1, cable management device 100 comprises a perimeter wall 110 defining a passageway 120 capable of receiving one or more cables (not shown in FIG. 1). In one embodiment, cable management device 100 further comprises a support piece 140 within passageway 120 that separates passageway 120 into separate passageways—passageway 121 and passageway 122—both of which are capable of receiving a cable coupled to a power center.

In the embodiment illustrated in FIG. 1, perimeter wall 110 contains an opening 111 capable of admitting the cable coupled to the power center. As an example, opening 111 can be large enough that such a cable may pass between the portions of perimeter wall 110 that surround opening 111. As another example, perimeter wall 110 may be flexed enough to allow the passage of a cable larger than the dimensions exhibited by opening 111 when perimeter wall 110 is in its normal, relaxed position. In a non-illustrated embodiment, cable management device 100 does not contain an opening analogous to opening 111.

Cable management device 100 still further comprises an attachment feature 130 adjacent to perimeter wall 110. In the embodiment illustrated in FIG. 1, attachment feature 130 protrudes away from perimeter wall 110 and has a substantially semicircular shape so as to be compatible with the substantially circular shape of a typical power cord. Attachment feature 130, like the rest of cable management device 100, may be made of a strong, flexible material such as polypropylene or the like.

Figure 2:
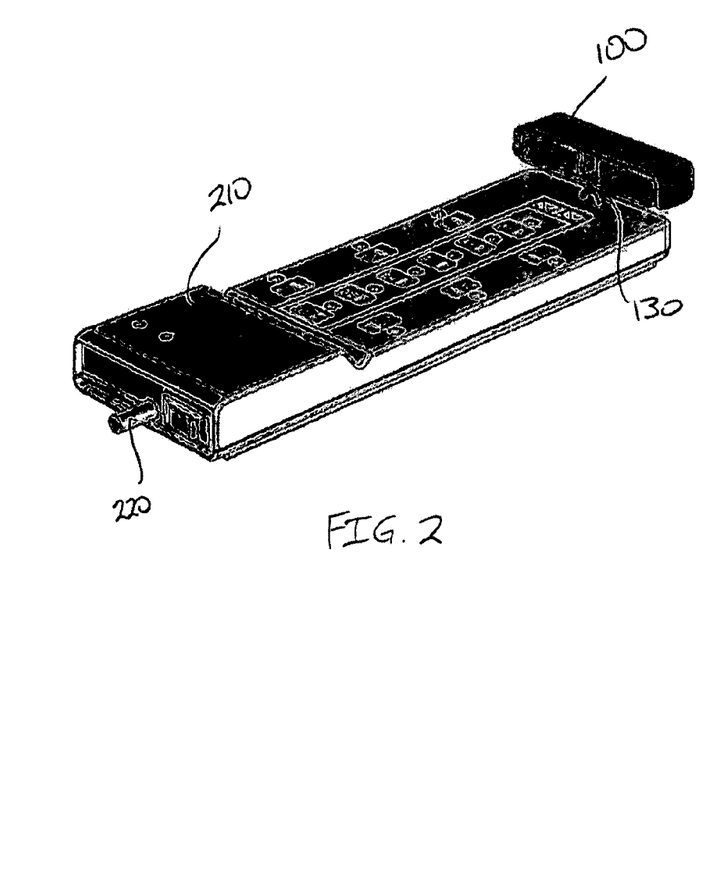
FIGS. 2 and 3 are perspective views of a cable management device showing alternate methods of attaching the cable management device to a power center according to an embodiment of the invention.
Figure 3:
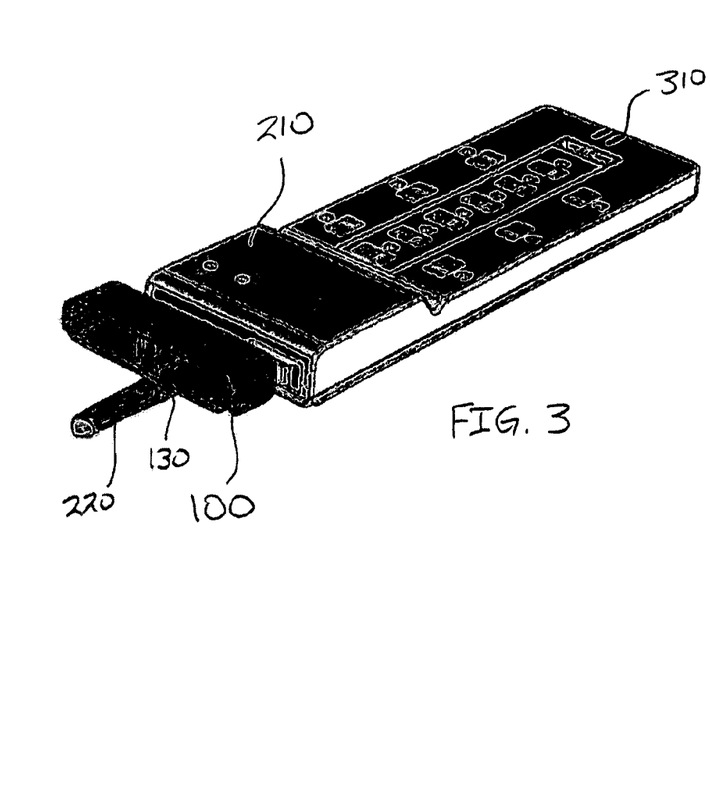

FIGS. 2 and 3 are perspective views of cable management device 100 showing alternate methods of attaching cable management device 100 to a power center 210 according to an embodiment of the invention. As explained above, the phrase "power center" herein includes within its scope any electronic device that is associated with a plurality of cords or cables, whether such cords or cables are an integral part of such electronic device or whether such cords or cables may be attached to or connected with such electronic device. In FIGS. 2 and 3, power center 210 is a surge protector or other power strip having a power cord 220.

Referring to FIGS. 1, 2, and 3, attachment feature 130 of cable management device 100 is capable of removably engaging cable management device 100 with power center 210 (see FIG. 2) and with power cord 220 (see FIG. 3). In FIG. 2, attachment feature 130 is shown as being engaged with an attachment slot 310 that is obscured from view by attachment feature 130 in FIG. 2 but that is visible in FIG. 3. In FIG. 3, attachment feature 130 is shown as being engaged with power cord 220. A similar attachment slot built into other types of power centers would facilitate attachment of cable management device 100 to those other types of power centers.

Figure 4:
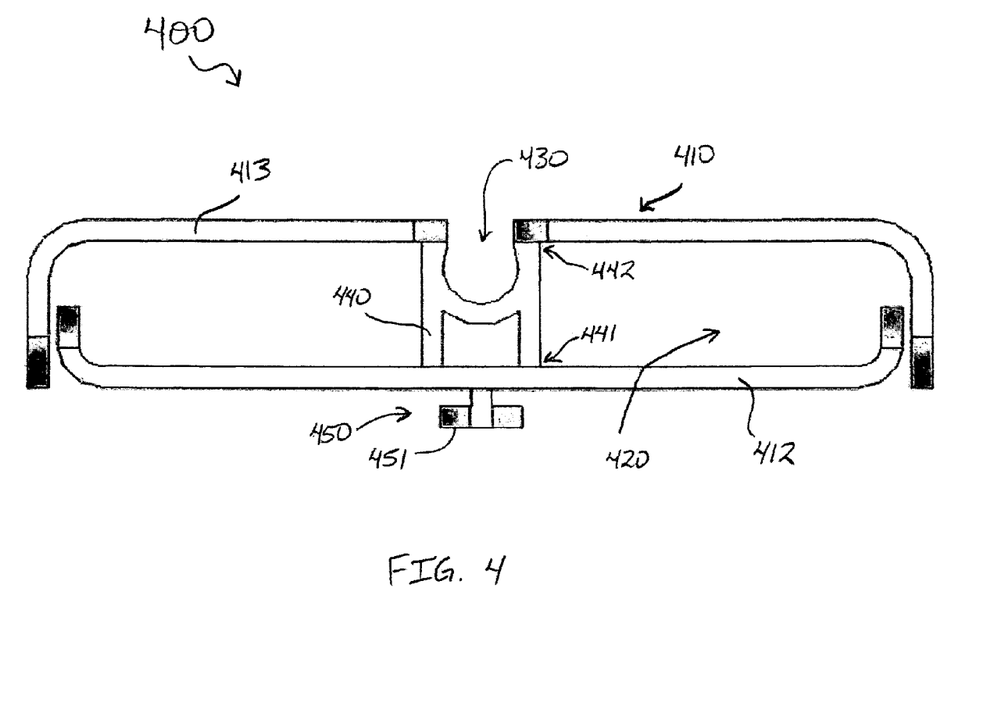
FIG. 4 is an elevational view of a different cable management device according to an embodiment of the invention.

FIG. 4 is an elevational view of a cable management device 400 according to an embodiment of the invention. As illustrated in FIG. 4, cable management device 400 comprises a perimeter wall 410 defining a passageway 420 capable of receiving one or more cables (not shown in FIG. 4) and a support piece 440. As an example, perimeter wall 410, passageway 420, and support piece 440 can be similar to, respectively, perimeter wall 110, passageway 120, and support piece 140, all of which were first shown in FIG. 1.

Cable management device 400 further comprises an attachment feature 430, which can be similar to attachment feature 130 that was first shown in FIG. 1, and an attachment feature 450 adjacent to perimeter wall 410. Attachment feature 430, like attachment feature 130, is capable of removably engaging cable management device 400 with a power cord such as power cord 220 (first shown in FIG. 2). In the illustrated embodiment, attachment feature 430 comprises an indentation in support piece 440.

In the illustrated embodiment, perimeter wall 410 comprises a wall section 412 and a wall section 413, and support piece 440 has an end 441 and an end 442 that is located opposite end 441. End 441 of support piece 440 is coupled to wall section 412 and extends away from wall section 412, while end 442 of support piece 440 is coupled to wall section 413. As illustrated, attachment feature 430 forms a channel or indentation in wall section 413. A different way of thinking of what is depicted in FIG. 4 involves considering attachment feature 430 as being a channel or indentation in support piece 440 and wall section 413 as containing a gap that allows access to attachment feature 430. Attachment feature 450 is coupled to wall section 412.

Attachment feature 450 is capable of removably engaging cable management device 400 with a power center such as power center 210 (also first shown in FIG. 2). In the illustrated embodiment, attachment feature 430 comprises an indentation in perimeter wall 410 and has a substantially semicircular shape capable of engagement with a power cord. Attachment feature 450 protrudes away from perimeter wall 410 and comprises a substantially planar portion 451 capable of engagement with a power center, as further described below.

Figure 5:
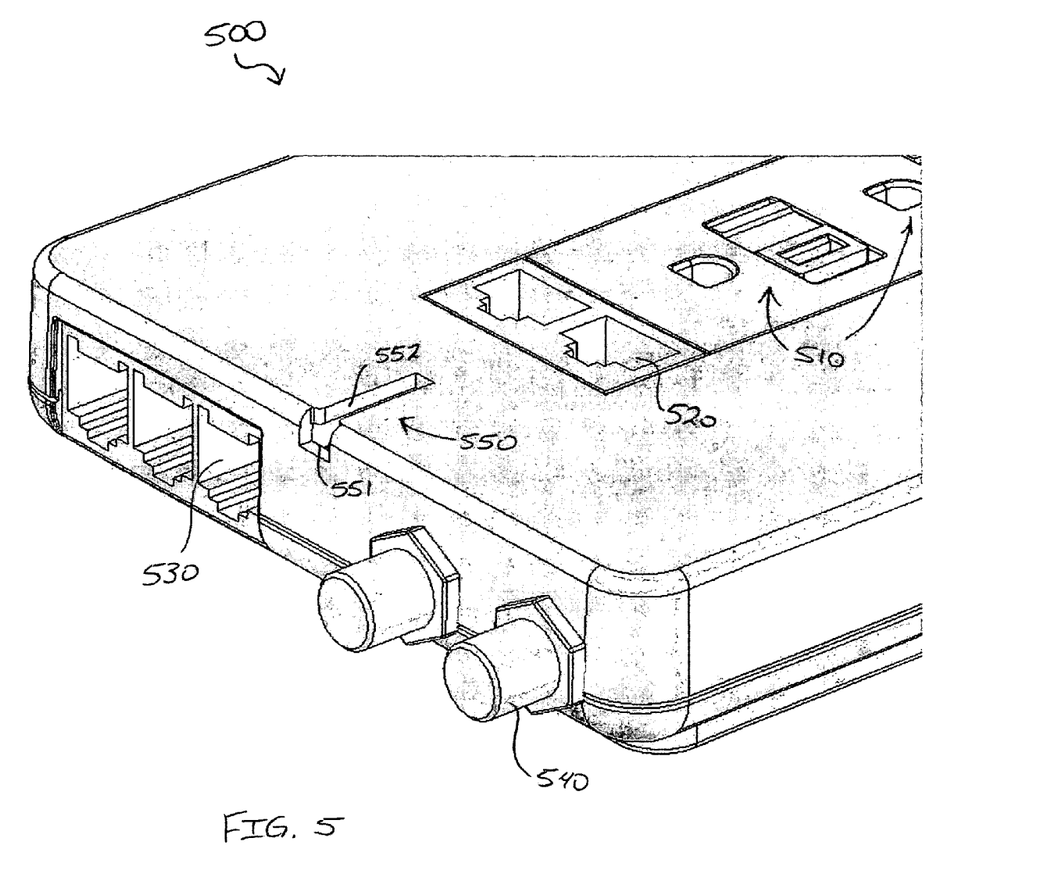
FIG. 5 is a perspective view of a portion of a power center according to an embodiment of the invention.
Figure 6:
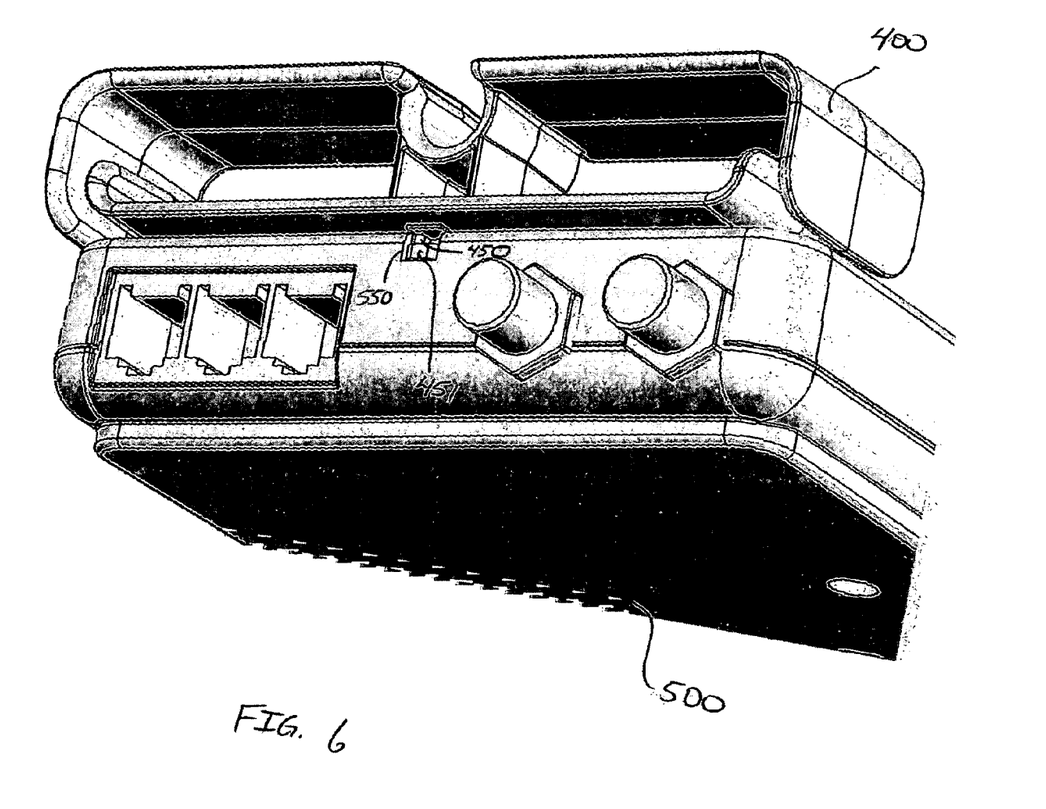
FIG. 6 is a perspective view of a portion of the power center of FIG. 5 showing an engagement between the power center and the cable management device of FIG. 4 according to an embodiment of the invention.

FIG. 5 is a perspective view of a portion of a power center 500 according to an embodiment of the invention. FIG. 6 is a perspective view of a portion of power center 500 showing an engagement between power center 500 and cable management device 400 according to an embodiment of the invention. Power center 500 comprises electrical outlets 510, RJ-45 jacks 520, RJ-11 jacks 530, coaxial cable inputs 540, and an attachment slot 550. Attachment slot 550 comprises an entry portal 551 and an overhang 552, and is capable of receiving attachment feature 450. As illustrated in FIG. 6, substantially planar portion 451 of attachment feature 450 may be inserted into entry portal 551 and slid under overhang 552 such that cable management device 400 is removably attached to power center 500.

Figure 7:
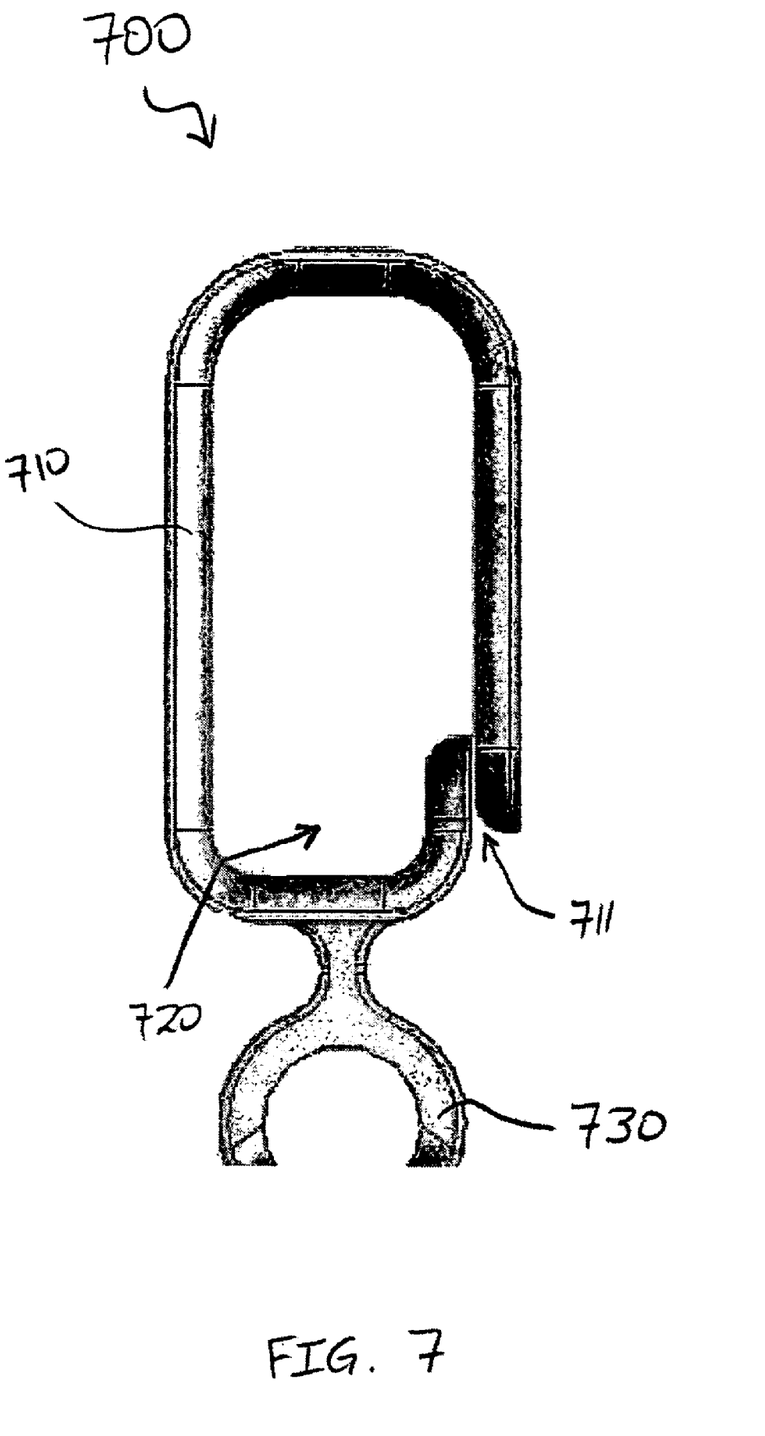
FIG. 7 is an elevational view of a cable management device according to a different embodiment of the invention.

The cable management devices depicted in the foregoing figures have dual passageways separate by a support piece. FIG. 7 is an elevational view of a cable management device 700 according to an embodiment of the invention. As shown, cable management device 700 contains only a single cable passageway. As illustrated in FIG. 7, cable management device 700 comprises a perimeter wall 710, an opening 711 in perimeter wall 710, a passageway 720, and an attachment feature 730. As an example, perimeter wall 710, opening 711, passageway 720, and attachment feature 730 can be similar to, respectively, perimeter wall 110, opening 111, passageway 120, and attachment feature 130, all of which were first shown in FIG. 1.

Figure 8:
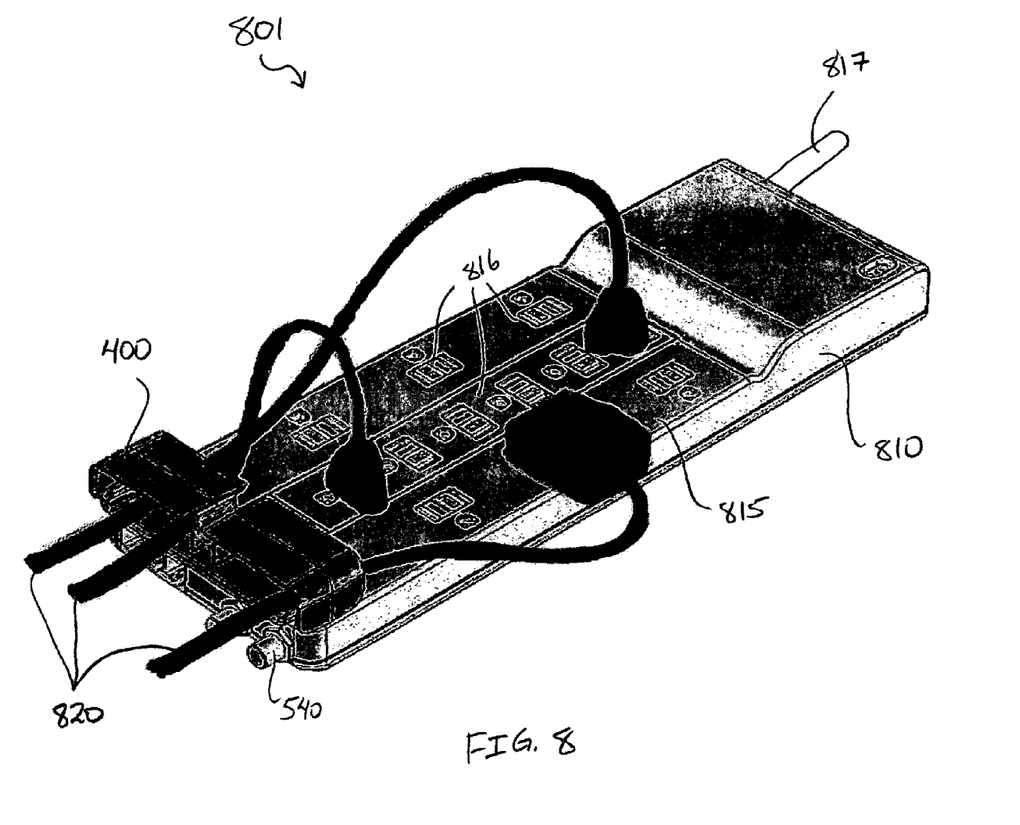
FIG. 8 is a perspective view of a cable management system including a cable management device and a power center according to an embodiment of the invention.

FIG. 8 is a perspective view of a cable management system 801 including cable management device 400 and a power center 810 according to an embodiment of the invention. As illustrated in FIG. 8, power center 810 comprises a housing 815, a plurality of electrical outlets 816 in housing 815, and a power cord 817 coupled to housing 815. An attachment slot in housing 815 is obscured by cable management device 400 but can be similar to attachment slot 310 of FIG. 3.

FIG. 8 depicts cable management device 400 being used in a first manner to organize and manage cables 820. More specifically, FIG. 8 depicts cable management device 400 directly engaged with power center 810 such that cables 820 are routed away from power cord 817 and toward coaxial cable inputs 540. Depending on the environment in which cable management system 801 is used, the manner of use for cable management device 400 illustrated in FIG. 8 may be the most effective and sensible manner, or simply the desired manner, in which to use cable management device 400.

Figure 9:
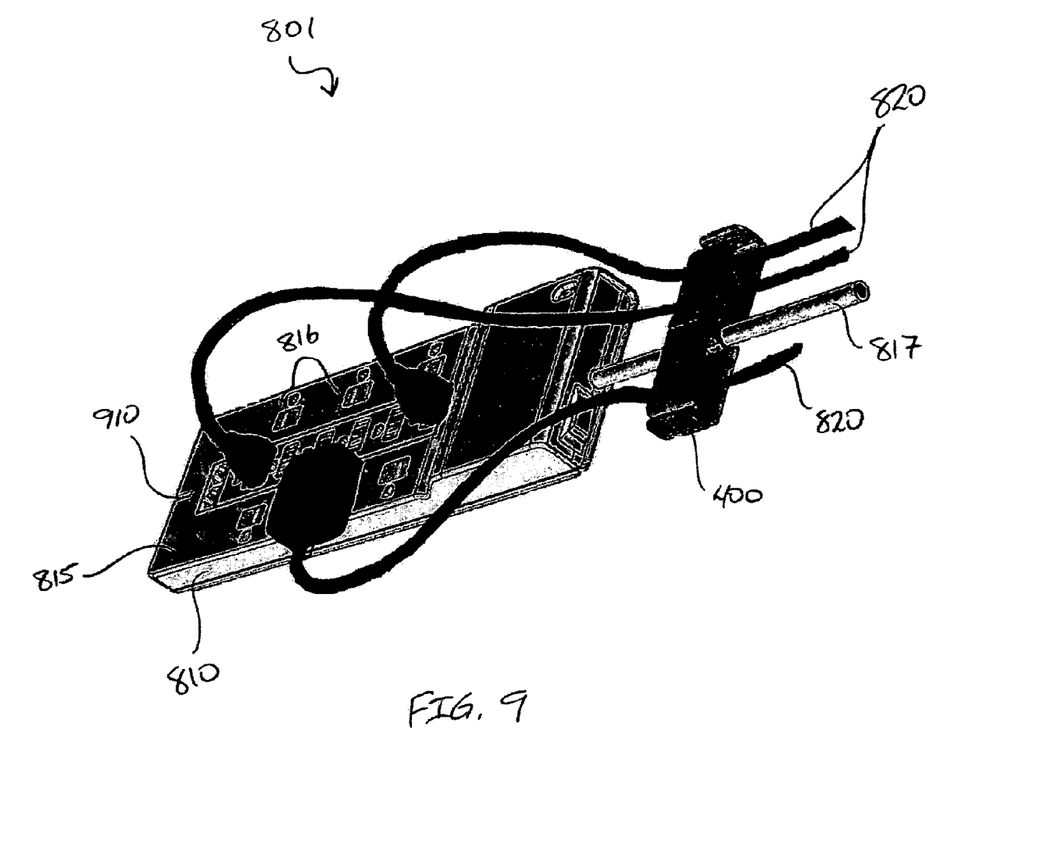
FIG. 9 is a perspective view of the cable management system of FIG. 8 showing the cable management device attached in an alternate manner to the power center according to an embodiment of the invention.

FIG. 9 is a perspective view of cable management system 801 showing cable management device 400 attached in an alternate manner to power center 810 according to an embodiment of the invention. An attachment slot 910, which was obscured from view in FIG. 8 as explained above, is visible in FIG. 9.

FIG. 9 depicts cable management device 400 being used in a second manner to organize and manage cables 820.

More specifically, FIG. 9 depicts cable management device 400 engaged with power cord 817 of power center 810 such that cables 820 are routed toward power cord 817. Depending on the environment in which cable management system 801 is used, the manner of use for cable management device 400 illustrated in FIG. 9 may be the most effective and sensible manner, or simply the desired manner, in which to use cable management device 400. In a non-illustrated embodiment, cable management device 400 may be used in a third manner, in which cables 820 are introduced into a passageway of cable management device 400 but where cable management device 400 is neither attached to a power center nor to a power cord of the power center. Instead, the third manner of use is one in which cable management device 400 "floats" on cables 820 themselves, meaning cable management device 400 moves freely along the lengths of cables 820. It will be readily apparent that cable management device 400, as well as the other cable management devices disclosed herein, may be used at least in what have been described above as the second and third manners in connection both with power centers that have attachment slots and with those that do not.

Figure 10:
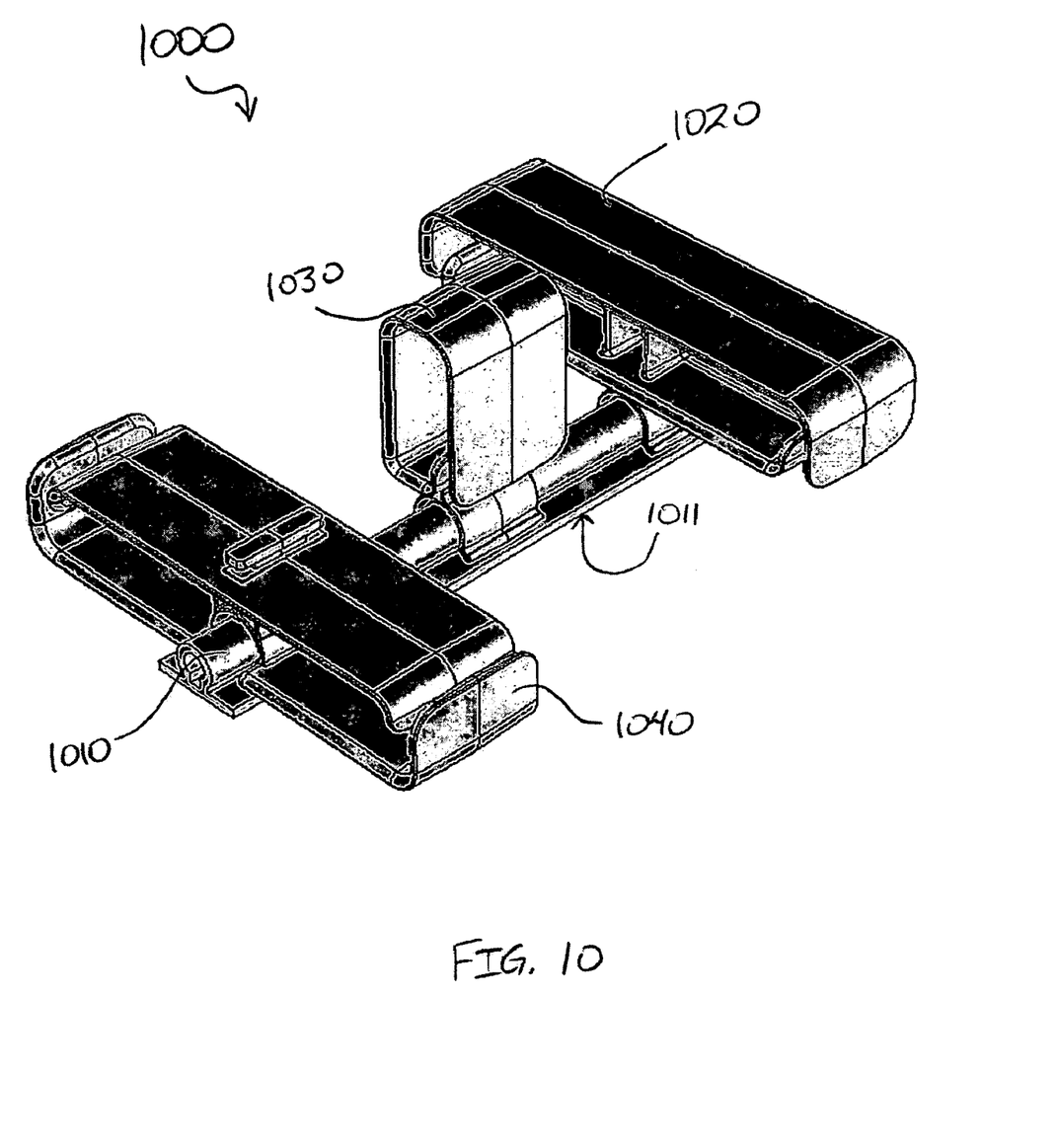
FIG. 10 is a perspective view of a different cable management system according to an embodiment of the invention.

FIG. 10 is a perspective view of a cable management system 1000 according to an embodiment of the invention. In the embodiment illustrated in FIG. 10, cable management system 1000 comprises a mounting rail 1010, a cable management device 1020, a cable management device 1030, and a cable management device 1040. Although the illustrated embodiment of cable management system 1000 comprises three cable management devices, in a non-illustrated embodiment, cable management system 1000 can comprise one or two cable management devices or can comprise more than three cable management devices. Also, any of the cable management devices that are part of cable management system 1000 can fit the description of any of the cable management devices described or disclosed herein.

Referring specifically again to the embodiment illustrated in FIG. 10, cable management device 1020 is similar to cable management device 100, first shown in FIG. 1, cable management device 1030 is similar to cable management device 700, first shown in FIG. 7, and cable management device 1040 is similar to cable management device 400, first shown in FIG. 4.

Mounting rail 1010 has a flat side 1011 that is capable of being mounted to a surface. As an example, flat side 1011 of mounting rail 1010 can be mounted to a near a computer workstation, a desk, a home entertainment center, or the like. As another example, mounting rail 1010 may be mounted to a surface such as those mentioned above (or another suitable surface) using adhesive, screws, a hook and loop fastener such as Velcro®, or the like. With mounting rail 1010 mounted in such a location, cable management system 1000 is in position to effectively manage and organize any cables that are in use nearby.

In one embodiment, one or more of cable management devices 1020, 1030, and 1040 are capable of sliding freely along at least a portion of the length of mounting rail 1010. In another embodiment, one or more of cable management devices 1020, 1030, and 1040 are permanently fixed to a particular location on mounting rail 1010. It should be understood that the length of mounting rail 1010 can vary as necessary or suitable for the particular environment or application in which cable management system 1000 is used.

Although the invention has been described with reference to specific embodiments, it will be understood by those skilled in the art that various changes may be made without departing from the spirit or scope of the invention. As an example, surge protectors or power strips of other shapes and forms may act as a power center with which the cable management device is used. As another example, the attachment slots and attachment features depicted and described herein may be replaced by analogous features that have a different appearance but perform the same functions. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the cable management device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A cable management device for use in connection with a power center, the cable management device comprising:
    a perimeter wall defining a passageway capable of receiving a cable coupled to the power center; and
    an attachment feature adjacent to the perimeter wall and capable of removably attaching to the cable management device with at least one of the power center and a power cord of the power center,
wherein:
    at least a portion of the attachment feature protrudes from the perimeter wall;
    the perimeter wall has a first end and a second end adjacent to the first end;
    the second end overlies the first end such that an opening exists in the perimeter wall; and
    the opening is configured to admit the cable coupled to the power center.

2. The cable management device of claim 1 wherein:
    the attachment feature is capable of removably attaching, at any time, the cable management device to only one of the power center and the power cord of the power center.

3. The cable management device of claim 1 wherein:
    the attachment feature:
        protrudes away from the perimeter wall;
        is made of a flexible material; and
        has a substantially Y-shape.

4. The cable management device of claim 1 further comprising:
a second attachment feature adjacent to the perimeter wall,
wherein:
the second attachment feature is capable of removably engaging the cable management device with the power cord of the power center; and
the attachment feature is capable of removably engaging the cable management device with the power center.

5. The cable management device of claim 4 wherein:
the second attachment feature comprises an indentation in the perimeter wall and has a substantially semicircular shape capable of engagement with the power cord; and
the attachment feature protrudes away from the perimeter wall and comprises a substantially planar portion capable of engagement with the power center.

6. The cable management device of claim 1 wherein:
the power center comprises at least one of a surge protector, a power strip, an uninterruptible power supply, and a television.

7. The cable management device of claim 1 further comprising:
a support piece within the passageway,
wherein:
the support piece separates the passageway into a first passageway and a second passageway, both of which are capable of receiving a cable coupled to the power center.

8. The cable management device of claim 1 wherein:
the attachment feature is capable of removably attaching to only the power cord of the power center.

9. The cable management device of claim 1 wherein:
the attachment feature is capable of removably attaching to only the power center.

10. A cable management system for use in connection with a power center, the cable management system comprising:
a cable management device comprising:
a first wall section;
a support piece having a first end and a second end, the support piece coupled at the first end to the first wall section and extending away from the first wall section;
a second wall section coupled to the second end of the support piece and having a channel therein, the second wall section comprising a first attachment feature of the cable management device; and
a second attachment feature coupled to the first wall section, wherein:
the first attachment feature is located in the channel;
the first wall section and the second wall section are portions of a perimeter wall that defines a passageway capable of receiving a cable coupled to the power center;
the first attachment feature is capable of removably engaging the cable management device with a power cord of the power center; and
the second attachment feature is capable of removably engaging the cable management device with the power center.

11. The cable management system of claim 10 wherein:
the first attachment feature comprises an indentation in the perimeter wall and has a substantially semicircular shape capable of engagement with the power cord; and
the second attachment feature protrudes away from the perimeter wall and comprises a substantially planar portion capable of engagement with the power center.

12. The cable management system of claim 11 further comprising:
a mounting rail; and
a second cable management device comprising:
a second perimeter wall defining a second passageway capable of receiving a cable coupled to the power center; and
a second attachment feature adjacent to the second perimeter wall and capable of removably engaging the second cable management device with at least one of the power center and a power cord of the power center,
wherein:
the cable management device and the second cable management device are coupled to the mounting rail.

13. The cable management system of claim 10 wherein:
the support piece is within the passageway; and
the support piece separates the passageway into a first passageway and a second passageway, both of which are capable of receiving the cable coupled to the power center.

14. The cable management system of claim 10 wherein:
the perimeter wall is formed from a flexible material; and
the perimeter wall contains at least one opening capable of admitting the cable coupled to the power center.

15. A cable management system comprising:
a power center comprising:
a casing; and
an attachment mechanism; and
a cable management device comprising:
a cable management portion having a cable retaining feature capable of holding one or more cables; and
an attachment section adjacent to the cable management portion and capable of coupling the cable management device with at least one of the attachment mechanism of the power center and a cord associated with the power center,
wherein:
at least a portion of the attachment section protrudes from the cable management portion;
the cable management portion has a first edge and a second edge overlaying the first edge; and
the cable management portion is configured such that the one or more cables can enter the cable retaining feature between the first edge and the second edge.

16. The cable management device of claim 15 wherein:
the one or more cables can be coupled to and removed from the cable retaining feature while the attachment section is coupled to the at least one of the power center and the cord associated with the power center.

17. The cable management device of claim 15 wherein:
the cord associated with the power center is removably attachable to the power center.

18. The cable management device of claim 15 wherein:
the cord associated with the power center is a power cord of the power center.

19. The cable management device of claim 15 wherein:
the attachment section comprises a portion with a substantially Y-shape.

20. The cable management device of claim 15 wherein:
the attachment section comprises:
an indentation in the perimeter wall and capable of engaging the cord associated with the power center; and
a substantially T-shaped section protruding away from the perimeter wall and capable of engaging the power center.

* * * * *